(12) United States Patent
Della Polla (10) Patent No.: US 8,764,027 B1
(45) Date of Patent: Jul. 1, 2014

(54) SLAB DOLLY

(71) Applicant: Michael Della Polla, Kennesaw, GA (US)

(72) Inventor: Michael Della Polla, Kennesaw, GA (US)

( * ) Notice: Subject to any disclaimer, the term of this patent is extended or adjusted under 35 U.S.C. 154(b) by 2 days.

(21) Appl. No.: 13/751,598

(22) Filed: Jan. 28, 2013

(51) Int. Cl.
*B62B 5/02* (2006.01)
*B62B 1/04* (2006.01)

(52) U.S. Cl.
USPC ............ 280/5.2; 280/5.26; 280/5.32; 280/30; 280/47.131; 280/47.16; 280/47.2; 280/47.34

(58) Field of Classification Search
USPC .......... 280/5.2, 5.26, 5.32, 30, 47.131, 47.16, 280/47.2, 47.34
See application file for complete search history.

(56) References Cited

U.S. PATENT DOCUMENTS

| | | | |
|---|---|---|---|
| 1,839,317 A | 5/1931 | Jankisz | |
| 3,061,323 A | 10/1962 | Tittes | |
| 3,199,692 A | 8/1965 | Lobre | |
| 3,269,478 A | 8/1966 | Joslyn | |
| 3,338,586 A | 8/1967 | Kirlin | |
| 3,494,440 A | 2/1970 | Hanson | |
| 3,515,401 A * | 6/1970 | Gross | 280/5.26 |
| 3,554,309 A | 1/1971 | Abercrombie | |
| 3,614,115 A * | 10/1971 | Berglund | 280/5.32 |
| 3,836,160 A | 9/1974 | Linsley | |
| 4,222,449 A | 9/1980 | Feliz | |
| 4,512,588 A | 4/1985 | Cox | |
| 4,569,409 A | 2/1986 | Kluth | |
| 5,036,929 A | 8/1991 | Trougouboff | |
| 5,707,200 A | 1/1998 | Liu | |
| 6,164,398 A * | 12/2000 | Alber | 180/8.2 |
| 6,328,120 B1 | 12/2001 | Häussler et al. | |
| 6,341,784 B1 | 1/2002 | Carstens | |
| 6,422,329 B1 * | 7/2002 | Kazerooni et al. | 180/19.3 |
| 6,752,400 B2 * | 6/2004 | Nakatsukasa et al. | 280/5.2 |
| 7,784,569 B2 | 8/2010 | Cheng et al. | |
| 8,231,131 B1 | 7/2012 | Rivera Negron | |
| 2003/0141685 A1 * | 7/2003 | Ziolkowski | 280/47.24 |
| 2004/0188960 A1 * | 9/2004 | Bierma | 280/5.2 |
| 2007/0261363 A1 * | 11/2007 | Justice | 52/749.1 |
| 2009/0172915 A1 | 7/2009 | Hunziker | |
| 2011/0052357 A1 * | 3/2011 | Torrison | 414/495 |
| 2012/0280462 A1 * | 11/2012 | Torrison | 280/5.2 |

FOREIGN PATENT DOCUMENTS

| | | |
|---|---|---|
| DE | 2524717 A1 | 4/1975 |
| DE | 3518624 A1 | 11/1986 |
| DE | 4307918 A1 | 9/1994 |
| DE | 4409807 A1 | 9/1994 |
| EP | 2110294 A2 | 10/2009 |
| FR | 2232475 A1 | 1/1975 |
| JP | 61094877 A | 5/1986 |
| JP | 62117558 A | 5/1987 |
| TW | 200918384 A | 5/2009 |
| WO | 03066408 A1 | 8/2003 |

* cited by examiner

*Primary Examiner* — Joseph M Rocca
*Assistant Examiner* — Marlon Arce
(74) *Attorney, Agent, or Firm* — Thomas | Horstemeyer, LLP (57) ABSTRACT

In one embodiment, a slab dolly for moving slabs of material includes a body adapted to support a slab of material, wheels that support the body, handles that extend to a rear of the body, and a leg that is pivotally connected to the body, the leg being adapted to drop down from the body and engage a floor surface or stair steps to act as a pivot member about which the dolly can be pivoted to assist a user in moving the dolly up a flight of stairs.

21 Claims, 14 Drawing Sheets

SLAB DOLLY

BACKGROUND

Countertops and other home design components are often constructed of heavy slabs of material, such as stone or a heavy man-made material. Because of the size and weight of such slabs, dollies are often used to transport the slabs from place to place. Such dollies normally comprise a frame that secures the slab and that is supported by wheels that enable one to roll the slab across a floor or other flat surface.

While existing slab dollies make it easier to move heavy slabs of material across flat surfaces, they are not designed to assist users in moving the slabs up stairs. It would be desirable to have a device that facilitates moving slabs up such stairs.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a device that facilitates moving heavy slabs of material up stairs. Disclosed herein is a slab dolly that is designed not only to facilitate movement of a slab of material across a flat surface but also to facilitate moving of the slab up stairs. In some embodiments, the slab dolly comprises a body that is supported by wheels. The dolly further includes pivotable legs that enable users to "walk" the dolly up stairs while under the load of a heavy slab. In some embodiments, the dolly and slab can be moved up the stairs by two persons. In other embodiments, the dolly and slab can be moved up the stairs by a single person.

In the following disclosure, various specific embodiments are described. It is to be understood that those embodiments are example implementations of the disclosed inventions and that alternative embodiments are possible. All such embodiments are intended to fall within the scope of this disclosure.

FIGS. 1-5 illustrate a first embodiment of a slab dolly 10 that can be used to move heavy slabs of material, such as slabs of stone or a heavy man-made material. As is shown in the figures, the dolly 10 generally comprises a body 12. In the illustrated embodiment, the body 12 includes a front wall 14, a rear wall 16, a left side wall 18, a right side wall 20, and a base 22 that together form an open-topped rectangular box. The body 12 is made of a strong material such as steel that can withstand the weight of a heavy slab. The individual walls and base that form the body 12 can be formed from independent pieces of material, in which case they are secured together with fasteners or by welding. Alternatively, one or more of the walls and base can be formed from the same piece of material.

As is shown in FIGS. 1-5, the body 12 is supported by multiple wheels, including front wheels 24 and rear wheels 26. In the illustrated embodiment, the slab dolly includes two front wheels 24 and three rear wheels 26, although alternative numbers of wheels are possible. The front wheels 24 are caster wheels that can not only rotate about their own axes but also can rotate about a vertical axis to facilitate turning of the dolly 10. The rear wheels 26 can rotate about a single axis and include air-filled rubber tires 28 that are mounted on rigid inner wheels 30.

Figure 6:
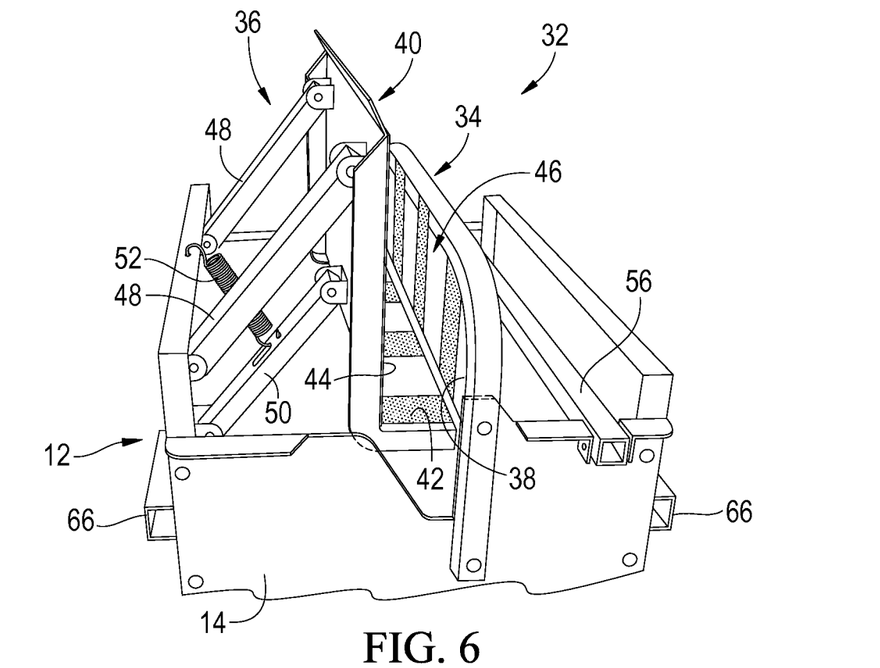
FIG. 6 is a top perspective detail view of the slab dolly of FIG. 1 showing a slab securing mechanism of the dolly.

With reference to FIG. 6, mounted to the top of the body 12 is a slab securing mechanism 32 that is adapted to support a slab of material in a vertical orientation. In the illustrated embodiment, the slab securing mechanism 32 includes a first lateral support 34 and a second lateral support 36, each of which is made of a strong material, such as steel. The first lateral support 34 includes a first vertical wall 38 that is adapted to contact a first side of a slab when secured by the securing mechanism 32. In the illustrated embodiment, the vertical wall 38 has a planar inner surface that can make flush contact with the slab.

The second lateral support 36 is a pivoting component that is adapted to urge the slab against the first lateral support 34 when a slab is secured by the mechanism 32. The second lateral support 36 includes a support member 40 having a generally L-shaped cross-section formed by a horizontal base 42 and a second vertical wall 44. As can be appreciated from FIGS. 6 and 7, the base 42 and wall 44 of the second lateral support 36 and the wall 38 of the first lateral support 34 together form a rectangular gap 46 into which a slab can be inserted.

Figure 7:
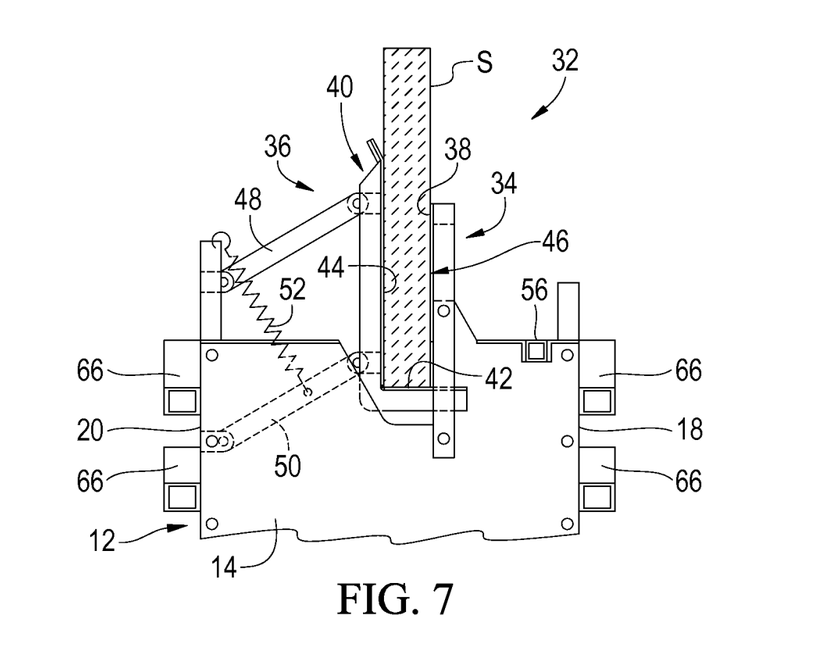
FIG. 7 is a front detail view of the slab dolly of FIG. 1 showing the slab securing mechanism of FIG. 6 in a closed orientation.

As is shown in FIGS. 6 and 7, the support member 40 is itself supported by multiple pivot arms, including two upper pivot arms 48 and a lower pivot arm 50. Each arm 48, 50 is pivotally connected to both the inner side of the right side wall 20 and to the outer side of the second vertical wall 44 in a manner in which the arms are generally parallel to each other. With such a configuration, the support member 40 can pivot in a direction in which it simultaneously moves downward and inward toward the first vertical wall 38 of the first lateral support 34 without the horizontal base 42 or the second vertical wall 44 changing their angular orientation. Accordingly, the horizontal base 42 remains horizontal and the second vertical wall 44 remains vertical as the support member 40 pivots.

The second lateral support 36 further comprises a biasing element in the form of a tension spring 52 that is connected at one end to the right side wall 20 at a relatively high position and connected at the other end to the lower pivot arm 50 at a lower position. With such a configuration, the spring 52 maintains the support member 40 in an upper orientation shown in FIG. 6 against the force of gravity.

FIG. 7 shows a slab, S, as secured by the securing mechanism 32. As is apparent from that figure, the slab has been inserted into the gap 46. As the slab's weight is transferred to the base 42 of the support member 40, the support member is pivoted downward against the force of the spring 52. As the L-shaped member 40 pivots downward it simultaneously pivots inward toward the first vertical wall 38 of the first lateral support 34. Once the full weight of the slab has been transferred to the base 42, the two vertical walls 38, 44 firmly press against opposite sides of the slab to pinch it and securely hold it in place. To ensure that the slab does not tilt forward or rearward out of the gap 46, securing straps (not shown) can be used to tie down the slab to the dolly 10.

Figure 8:
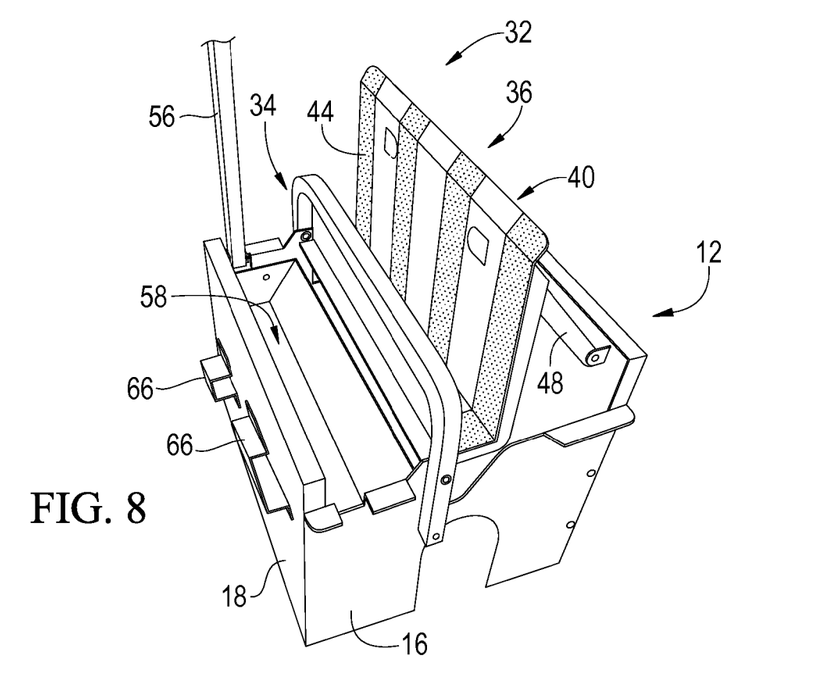
FIG. 8 is a top perspective detail view of the slab dolly of FIG. 1 showing a storage tray of the dolly.

With reference back to FIG. 3, the slab dolly 10 can further include a pull handle 56 that can be used to pull the dolly along a flat surface. As is apparent from that figure, the handle 56 can be pivoted from a collapsed position in which it lies horizontally across the top of the body 12 to an extended position (shown with phantom lines) in which it extends from the front of the body so that it can be used to pull the dolly 10 from its front side. Such extension is possible because the handle 56 is pivotally mounted at its proximal end to the top of the body 12. As is shown in FIG. 8, when the handle 56 is extended it provides access to a storage tray 58 in which various items, such as securing straps and bungee cords, can be stored.

Figure 9:
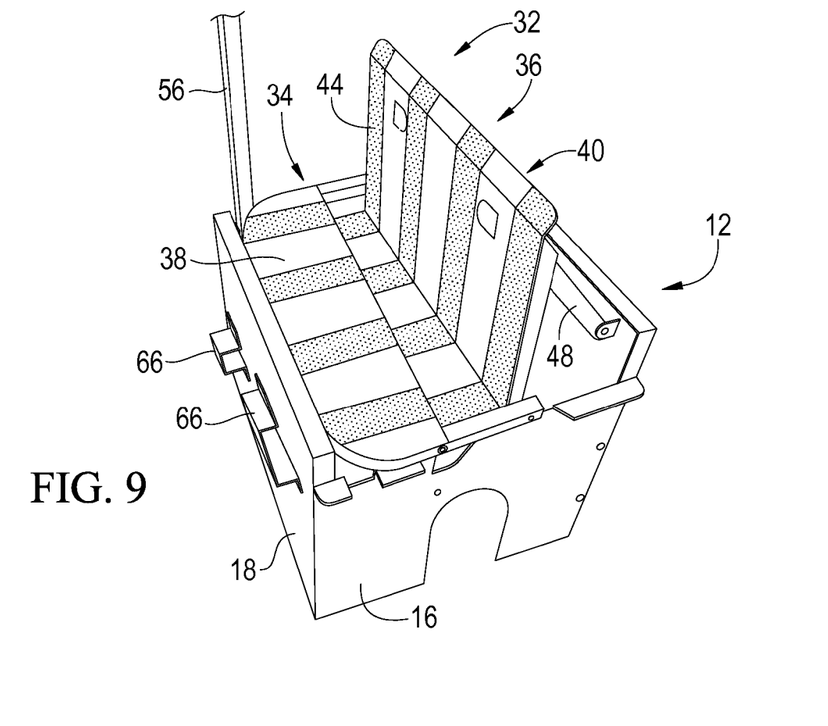
FIG. 9 is a top perspective detail view of the slab dolly of FIG. 1 showing a support platform of the dolly.

In some embodiments, the first lateral support 34 can fold down when not in use securely holding a slab in place. The folded down orientation is shown in FIG. 9. As can be appreciated from that figure, the first lateral support 34 can be pivoted such that its "vertical" wall 38 is placed in a horizontal orientation in which it forms a horizontal support platform. In such a case, the first lateral support 34 covers the storage tray 58 and is available to temporarily support items, including the slab. In some embodiments, the first lateral support 34 is fixed in its vertical orientation (FIG. 8) with one or more pins but can pivot to its horizontal orientation (FIG. 9) after the pins have been removed.

Figure 1:
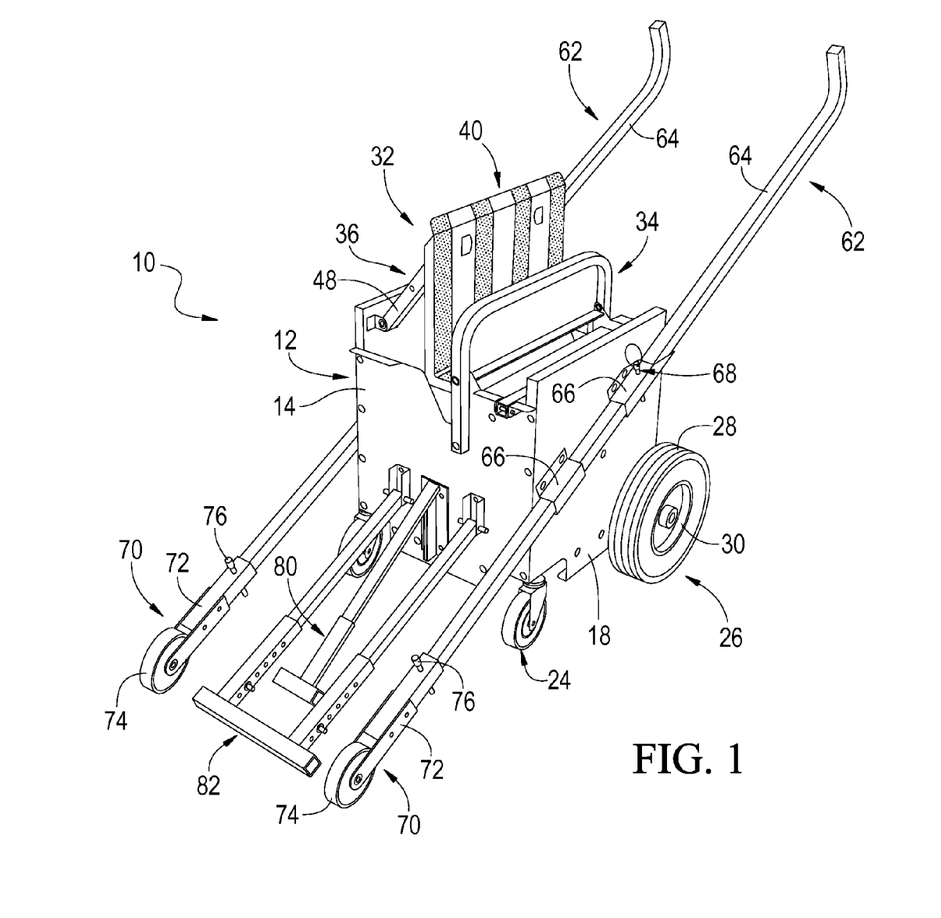
FIG. 1 is a front left perspective view of a first embodiment of a slab dolly.
Figure 2:
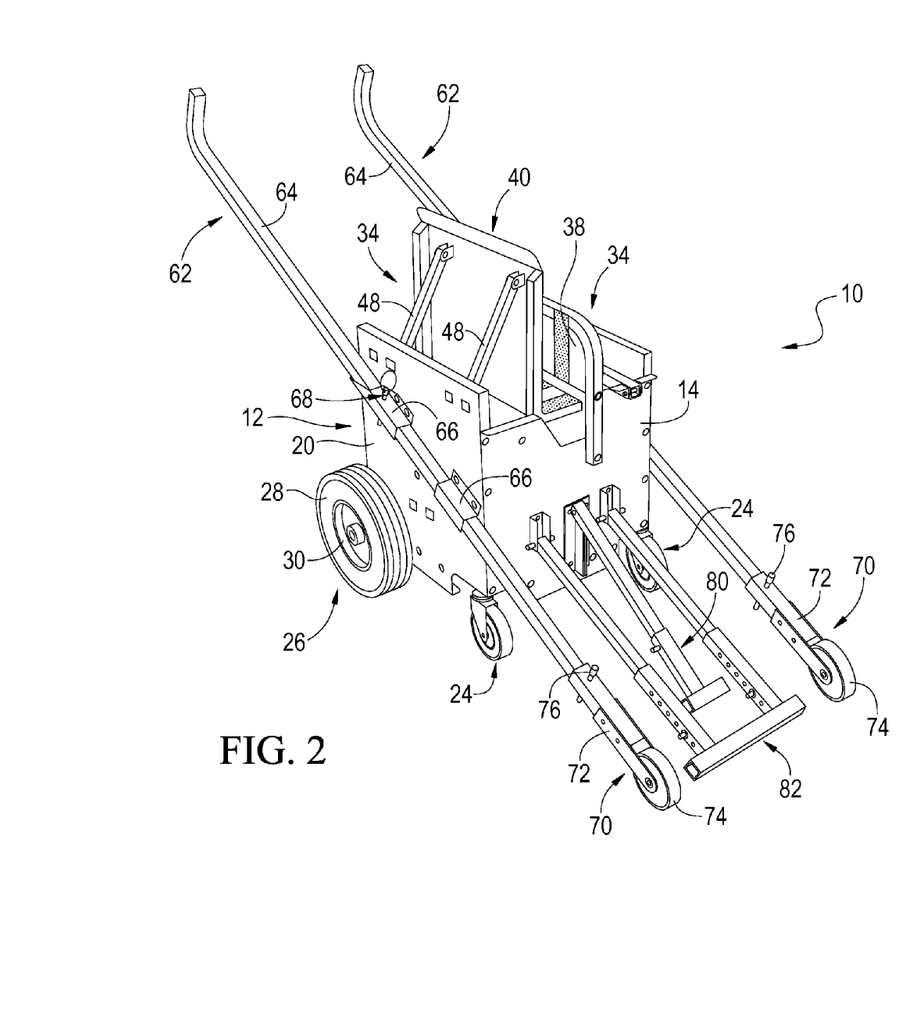
FIG. 2 is a front right perspective view of the slab dolly of FIG. 1.
Figure 3:
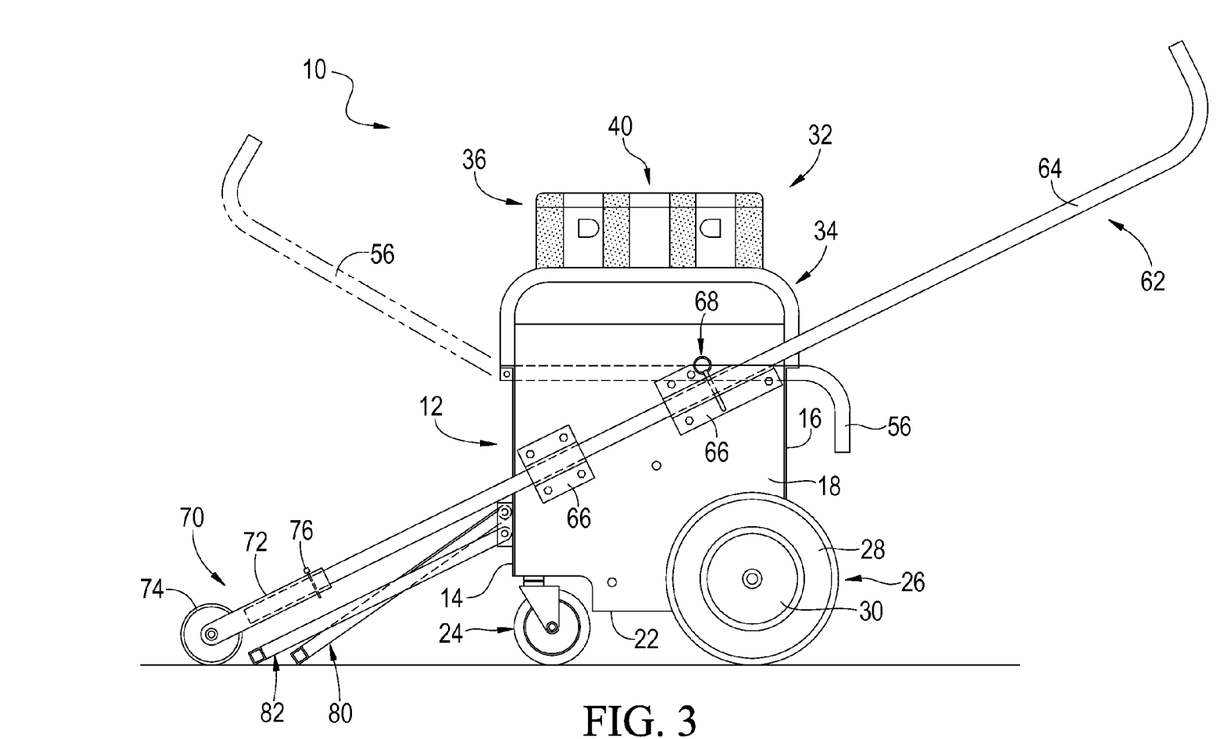
FIG. 3 is a left side view of the slab dolly of FIG. 1.
Figure 4:
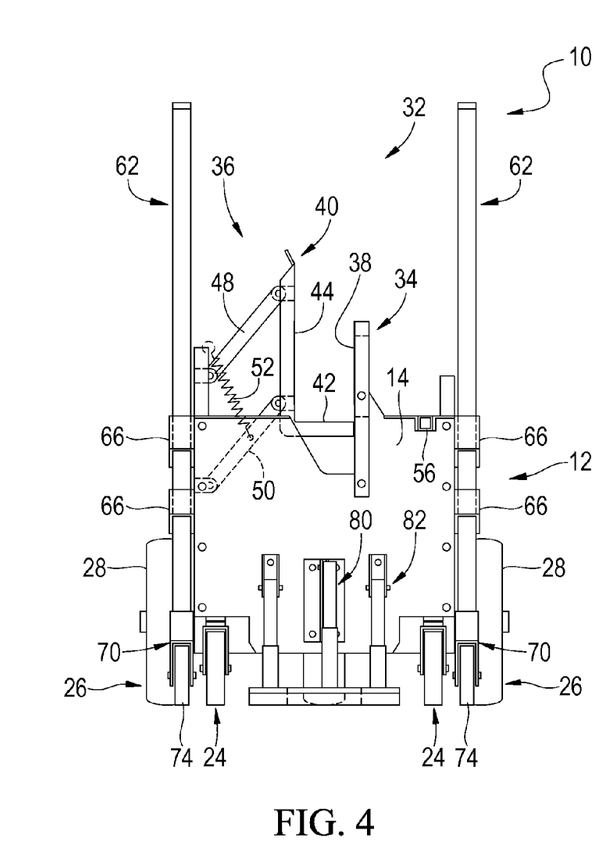
FIG. 4 is a front view of the slab dolly of FIG. 1.
Figure 5:
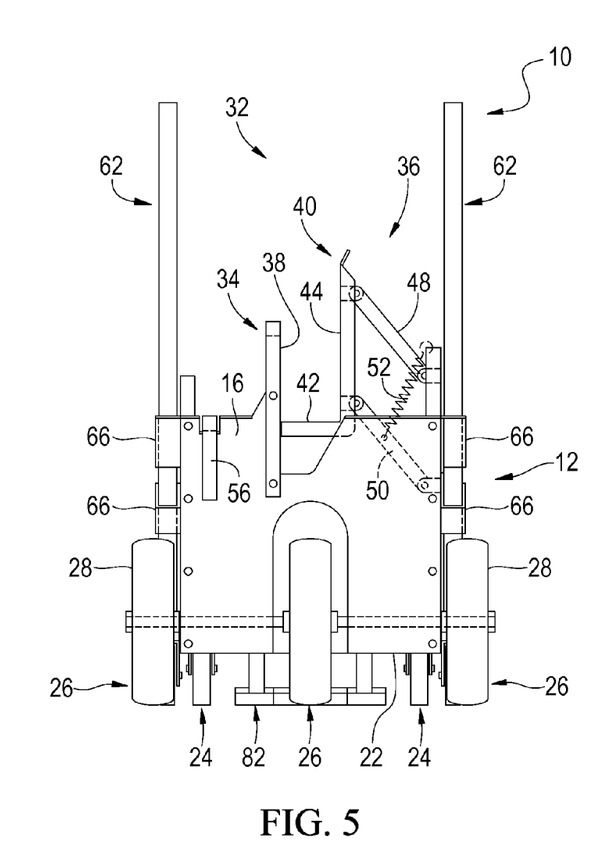
FIG. 5 is a rear view of the slab dolly of FIG. 1.

Returning to FIGS. 1-3, the slab dolly 10 further includes maneuvering handles 62 that, as described in detail in relation to FIG. 11, can be used to move a loaded dolly across a floor surface and up stairs. As is shown in FIGS. 1-3, the handles 62 include elongated shafts 64, which can be made of steel. The shafts 64 pass through mounting brackets 66 attached to the outer sides of the left and right side walls 18, 20. The mounting brackets 66 are angled relative to the body 12 so that the shafts 64 are likewise angled. As is apparent from FIG. 3, the shafts 64 form an angle of approximately 20 to 30 degrees with the floor or ground surface on which the slab dolly 10 rests. Because of that angulation and the length of the shafts 64, the shafts extend from a relatively high position to the rear of the body 12 down to a relatively low position to the front of the body. As is shown in FIGS. 1-3, the rear ends of the shafts 64 can be turned upward to enable a user to get a better grip on the handles during use. In some embodiments, the shafts 64 are secured to one of the mounting brackets 66 on each side of the body 12 with a fastener 68, such as a removable pin, to maintain the orientation shown in FIG. 3.

With further reference to FIGS. 1-3, wheel assemblies 70 are attached to the front ends of the elongated shafts 64. As is shown in those figures, the wheel assemblies 70 include mounting brackets 72 that enable the wheel assemblies to removably attach to the shafts 64 and wheels 74 that the facilitate pivoting and rolling of the slab dolly 10 to move it up stairs. In some embodiments, the mounting brackets 72 surround the ends of the shafts 64 and are held in place with fasteners 76, such as removable pins. When the wheel assemblies 70 are attached to the shafts 64, their wheels 74 can contact or nearly contact the floor surface, as shown in FIG. 3. It is noted that, when the slab dolly 10 is not to be used to move a slab up stairs, the handles 62 can be removed by removing the wheel assemblies 70 and withdrawing the shafts 64 from their mounting brackets 66. In such a case, the pull handle 56 provides a convenient way to move the dolly 10 over a floor surface.

The slab dolly 10 further includes a first front leg 80 and a second front leg 82 that, like the wheel assemblies 70, facilitate moving the dolly 10 up stairs. More particularly, the front legs 80, 82 act as pivot members about which the dolly 10 can be pivoted when moving the dolly up stairs. The front legs 80, 82 are shown in detail in FIG. 10. As is shown in that figure, both legs 80, 82 can rest on the floor prior to use. A proximal end of the first front leg 80 is pivotally attached to a mounting bracket 84 that is attached to the front wall 14 of the body 12 at a central point along its width. In some embodiments, the first front leg 80 is mounted to the bracket 84 with a removable fastener, such as a removable pin 86, so that the leg can be removed from the body 12 when not needed. The first front leg 80 comprises an elongated shaft 88 to which is attached an extension element 90. In some embodiments, the elongated shaft 88 is formed from steel angle iron, in which case it has an L-shaped cross-section. The extension element 90 is a T-shaped member having a body 92 that attaches to the distal end of the elongated shaft 88 and a transverse foot 94 that, as is described below, is adapted to engage the floor and stair steps. In some embodiments, the body 92 of the extension element 90 is also formed from steel angle iron. The extension element 90 can be mounted to the elongated shaft 88 with a removable fastener, such as a removable pin 96, that can be passed through openings 98 formed in the body 92 of the element. With such a configuration, the extension element 90 can be mounted to the elongated shaft 88 in multiple different positions along its length to adjust the length of the first front leg 80.

Figure 10:
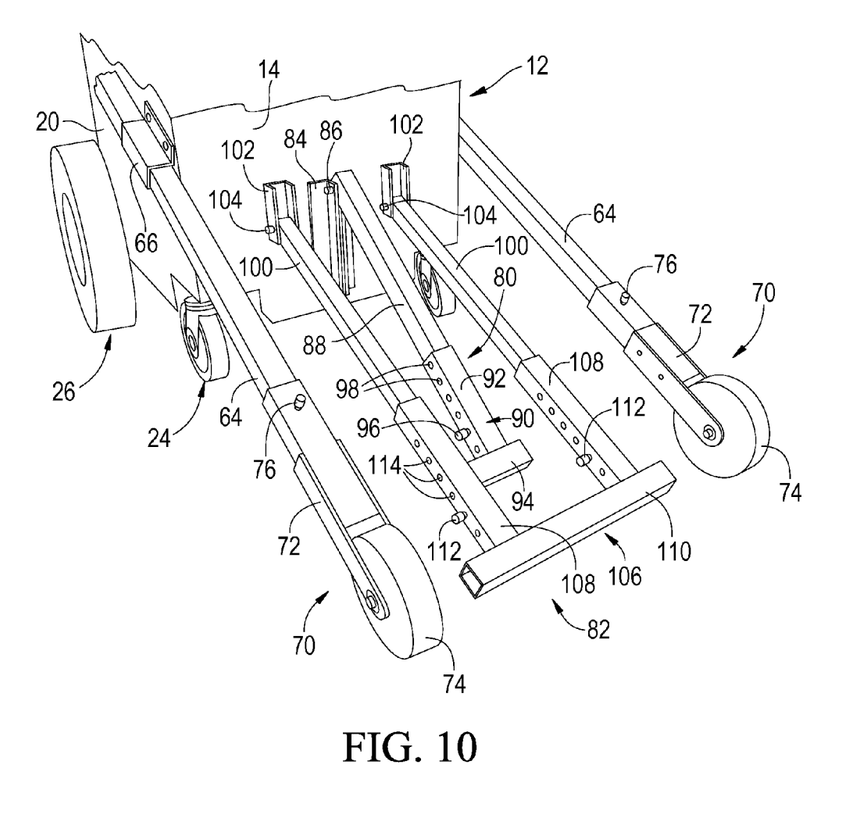
FIG. 10 is a front right perspective detail view of the slab dolly of FIG. 1 showing front legs of the dolly.

With further reference to FIG. 10, the second front leg 82 comprises two elongated shafts 100 that are pivotally attached to mounting brackets 102 that are attached to the front wall 14 of the body 12 at points laterally outward of the attachment point of the mounting bracket 84. In some embodiments, the elongated shafts 100 are also mounted to the brackets 102 with removable fasteners, such as removable pins 104, so that the second front leg 82 can also be removed from the body 12 when not needed. In some embodiments, the elongated shafts 100 are formed from tubular steel.

The second front leg 82 also comprises an extension element 106. The extension element 106 comprises two tubular bodies 108, each of which surrounds a distal end of one of the elongated shafts 100. In addition, the extension element 106 comprises a transverse foot 110 that is attached to the distal ends of the tubular bodies 108 that also is adapted to engage the floor and stair steps. In some embodiments, the extension element 106 is mounted to the elongated shafts 100 with removable fasteners, such as removable pins 112, that can be passed through openings 114 formed in the bodies 108. With such a configuration, the extension element 106 can be mounted to the elongated shafts 100 in multiple different positions along their lengths to adjust the length of the second front leg 82.

Figure 11A:
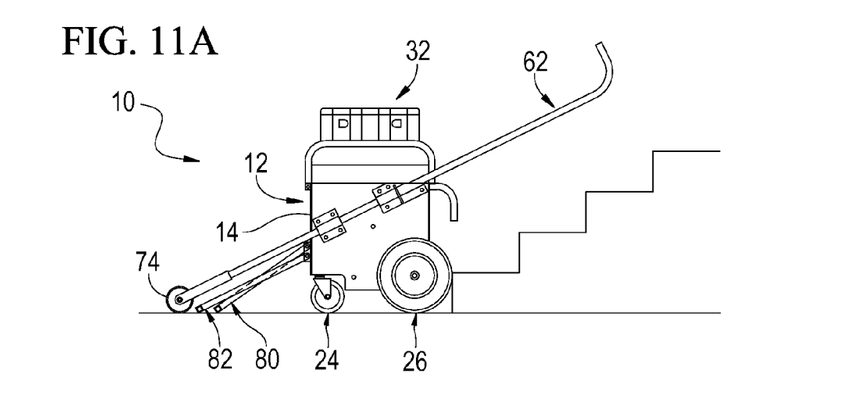
FIGS. 11A-11I are sequential side views illustrating maneuvering of the slab dolly of FIG. 1 up a flight of stairs.
Figure 11B:
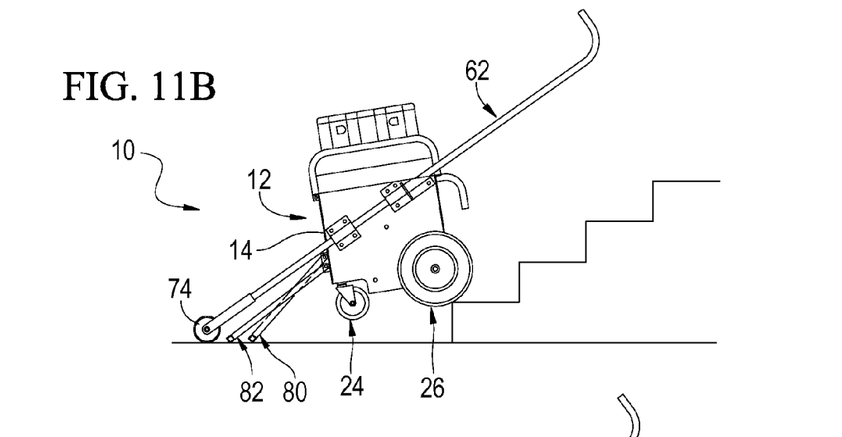

FIGS. 11A-11I illustrate an example of the use of the slab dolly 10 described above in relation to FIGS. 1-10. More particularly, FIGS. 11A-11I illustrate moving the slab dolly 10 up a flight of stairs. In some embodiments, the stairs can form part of a narrow staircase that includes walls on both sides of the stairs. Although no slab is shown in FIGS. 11A-

11I for reasons of clarity, it can be assumed that the slab dolly 10 supports a heavy slab of material in its slab securing mechanism 32 in that manner shown in FIG. 7 and that the slab is tied down with securing straps. In such a case, the slab dolly 10 would be very difficult to carry up the stairs, even for two relatively strong persons. As is described below, however, the slab dolly 10 can be "walked" up the stairs using the maneuvering handles 62 and the front legs 80, 82. In the following description it is assumed that two persons move the slab dolly 10 up stairs, including a first user positioned behind the dolly and a second user positioned in front of the dolly.

Beginning with FIG. 11A, the slab dolly 10 is backed into the first step of the stairs. In that position, the rear wheels 26 of the dolly 10 contact the front side of the step and the front legs 80, 82 rest on the floor. At this point, the first user lifts up the rear of the dolly 10 with the maneuvering handles 62 from a position behind the dolly. The first user can, for example, do this while standing on the second or third step of the stairs. As is apparent from FIG. 11B, lifting up the handles 62 presses the wheels 74 at the front end of the handles into firm contact with the floor so that the slab dolly 10 pivots about the wheels. Because the lifting handles 62 act as levers, even heavy slabs can be lifted in this manner with relative ease.

Figure 11C:
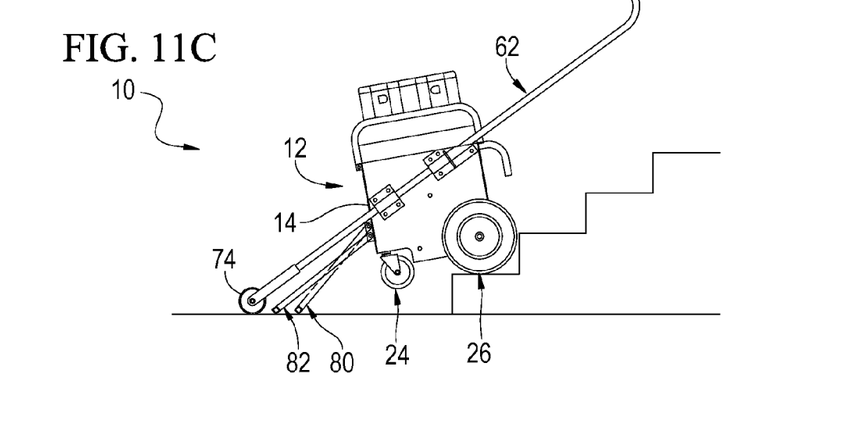

Once the rear wheels 26 have been lifted up to the point at which they contact the top edge of the first step (see FIG. 11B), the first user can pull back on the handles 62 to pull the wheels onto the first step, as indicated in FIG. 11C. The second user, who is standing in front of the slab dolly 10, can assist the first user in moving the rear wheels 26 to the first step by simultaneously pushing the dolly or the slab toward the first user. As the slab dolly 10 is moved backward, it rolls along the wheels 74 at the front ends of the handles 62, while the front legs 80, 82, which are free to pivot relative to the body 12, simply drag along the floor. Once the rear wheels 26 rest upon the first step as shown in FIG. 11C, the bulk of the weight of the slab is supported by those wheels and the wheels 74. Accordingly, neither the first user nor the second user need expend great effort in maintaining the dolly 10 in that position.

Figure 11D:
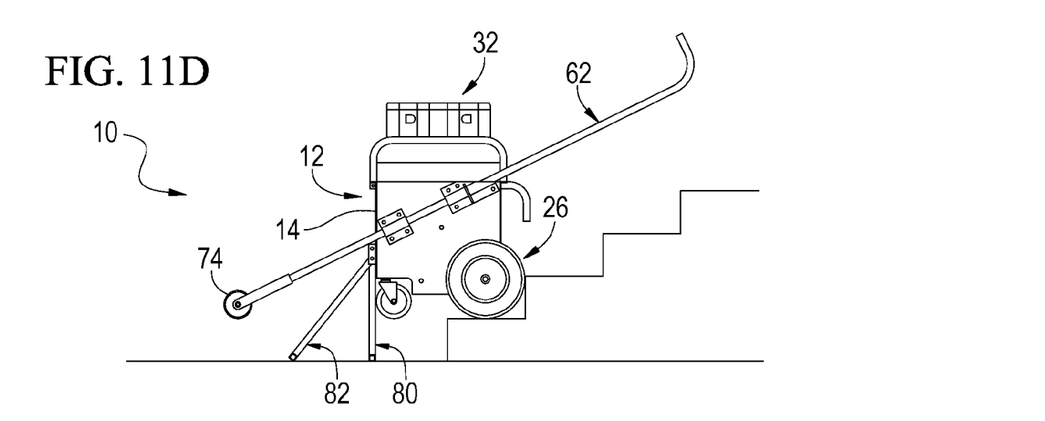

At this point, the first user can push down on the maneuvering handles 62 so as to pivot the front end of the slab dolly upward. When the first user does this, the first front leg 80 will pivot downward relative to the body 12 of the slab dolly 10 and will ultimately reach a point at which it is substantially parallel (e.g., substantially flush) with the front wall 14 of the body. If the first user then allows the front of the slab dolly 10 to pivot downward, the first front leg 80 will engage the floor at a point in front of the first step, as indicated in FIG. 11D. When in the position shown in FIG. 11D, the weight of the slab dolly 10 and its slab is entirely supported by the rear wheels 26 and the first front leg 80.

Figure 11E:
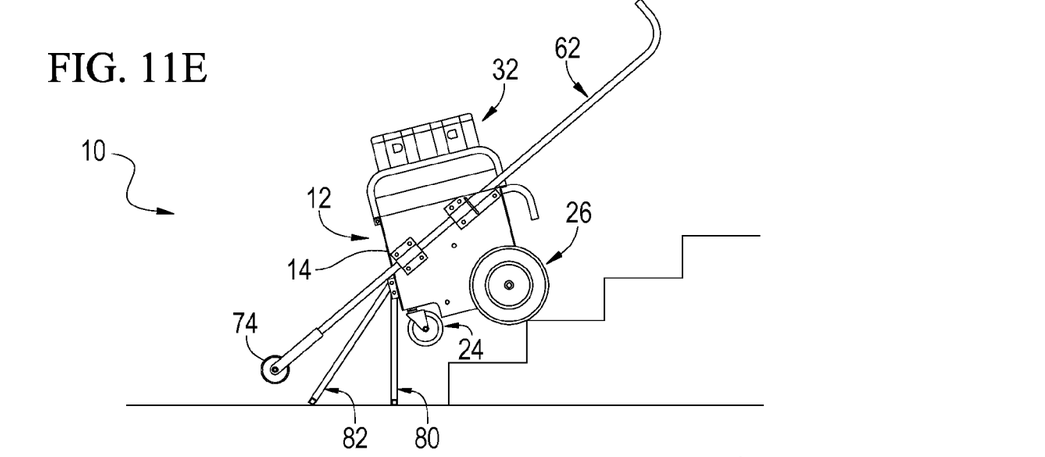
Figure 11F:
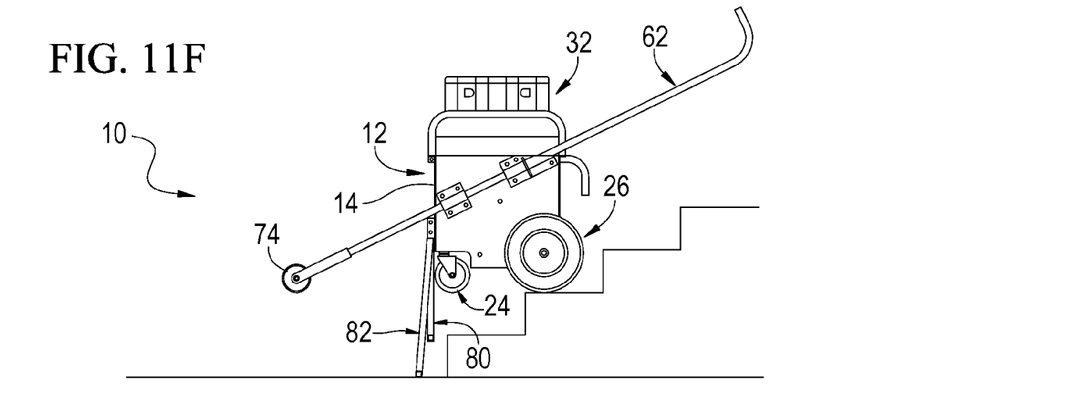

Next, the first user again lifts up on the maneuvering handles 62 to pivot the slab dolly 10 about the first front leg 80, as shown in FIG. 11E. The first user can, for example, do this while standing on the third or fourth step of the stairs. Once the rear wheels 26 have been lifted up to the point at which they contact the top edge of the second step (FIG. 11E), the first user can pull back on the handles 62 to pull the wheels onto the second step, as indicated in FIG. 11F. Again, the second user can assist the first user in moving the rear wheels 26 to the second step by simultaneously pushing the dolly 10 or the slab toward the first user.

Figure 11G:
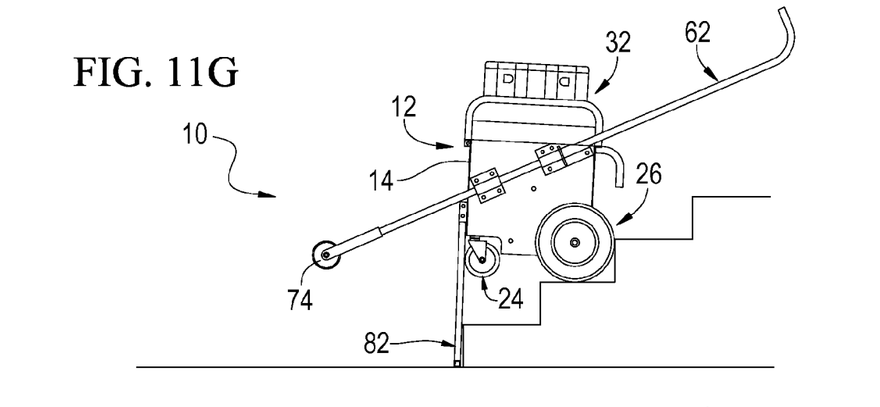

Once the rear wheels 26 rest upon the second step, the first user can push down on the handles 62 so as to pivot the front end of the slab dolly 10 upward. When the first user does this, the second front leg 82 will pivot downward until it is substantially parallel (e.g., substantially flush) with the front wall 14 of the body 12. If the first user allows the front of the slab dolly 10 to pivot downward, the second front leg 82 will then engage the floor, as shown in FIG. 11G. When in the position shown in FIG. 11G, the weight of the slab dolly 10 and its slab are entirely supported by the rear wheels 26 and the second front leg 82.

Figure 11H:
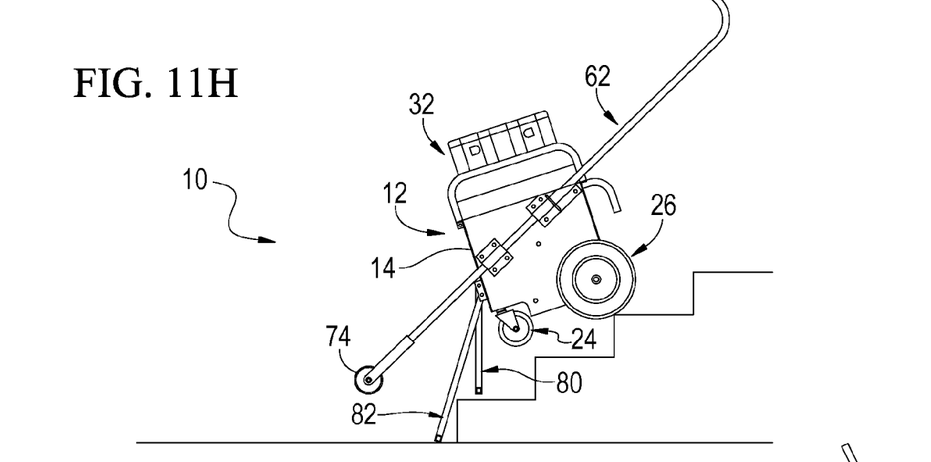
Figure 11I:
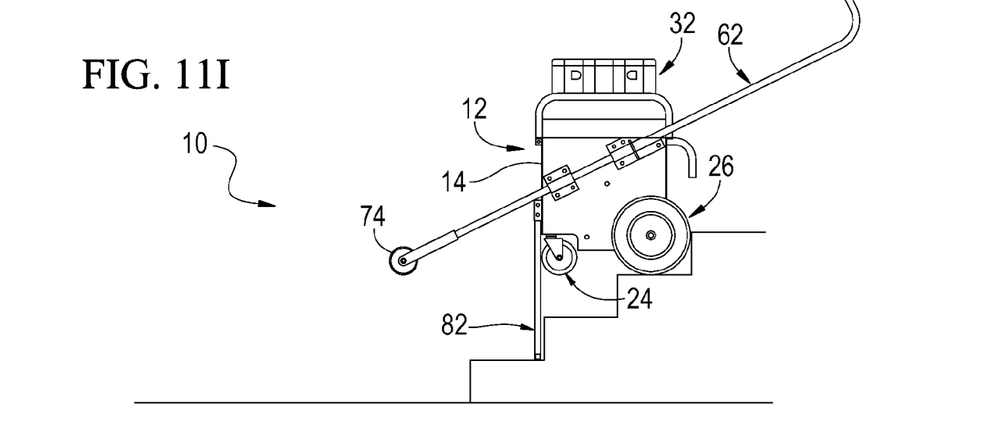

At this point, the first user lifts up on the maneuvering handles 62 to pivot the slab dolly 10 about the second front leg 82 as shown in FIG. 11H. Once the rear wheels 26 have been lifted up to the point at which they contact the top edge of the third step (FIG. 11H), the first user can pull back on the handles 62 to pull the wheels onto the third step. Again, the second user can assist the first user in moving the rear wheels 26 to that step by simultaneously pushing the dolly 10 or the slab toward the first user. Once the rear wheels 26 rest upon the third step, the first user can push down on the handles 62 to again pivot the front end of the slab dolly 10 upward. When the first user does this, the second front leg 82 will again pivot downward relative to the body 12. When the first user allows the front end of the dolly 10 to pivot downward, the second front leg 82 will engage the first step, as indicated in FIG. 11I.

Movement of the slab dolly 10 continues in the manner described above until each of the steps of the stairs has been traversed. As can be appreciated from the above discussion, the slab dolly 10 provides great leverage to the users so that they do not ever need to lift the full weight of the slab. In addition, because the slab dolly 10 supports its own weight once each step has been reached, the users need only exert effort intermittently and have the opportunity to rest at each step, if desired. In the typical case, however, no such rest is needed and the slab dolly 10 can be quickly walked up a typical flight of stairs in a matter of seconds.

Figure 12:
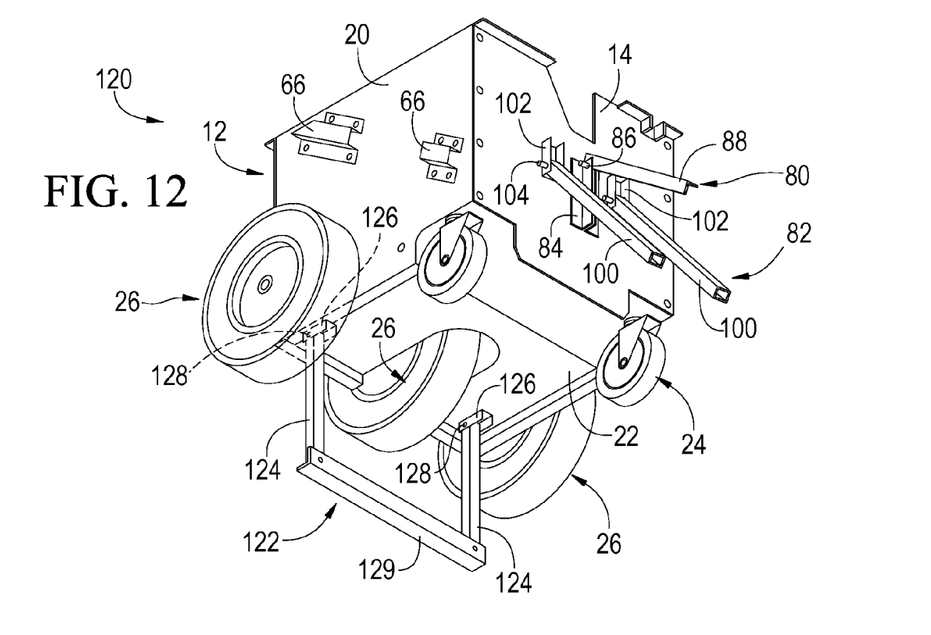
FIG. 12 is a bottom right perspective view of a second embodiment of a slab dolly.

FIG. 12 illustrates a second embodiment of a slab dolly 120. The slab dolly 120 shares many of the same components as the dolly 10 shown in FIGS. 1-10. Accordingly, the slab dolly 120 includes a body 12 that is supported by front wheels 24 and rear wheels 26. The slab dolly 120 further includes first and second front legs 80, 82 that are used to move the dolly up stairs. Unlike the dolly 10, however, the slab dolly 120 further includes a bottom leg 122. The bottom leg 122 comprises two elongated shafts 124 that are pivotally attached to mounting brackets 126, which are attached to the base 22 of the body 12 at points near the rear of the base. In some embodiments, the elongated shafts 124 are mounted to the brackets 126 with fasteners, such as removable pins 128, so that the bottom leg 122 can also be removed from the body 12 if not needed. In some embodiments, the elongated shafts 124 are formed from tubular steel. The bottom leg 122 also comprises a transverse foot 129 that is attached to the distal ends of the elongated shafts 124 and that is adapted to engage the floor and stair steps.

Figure 13:
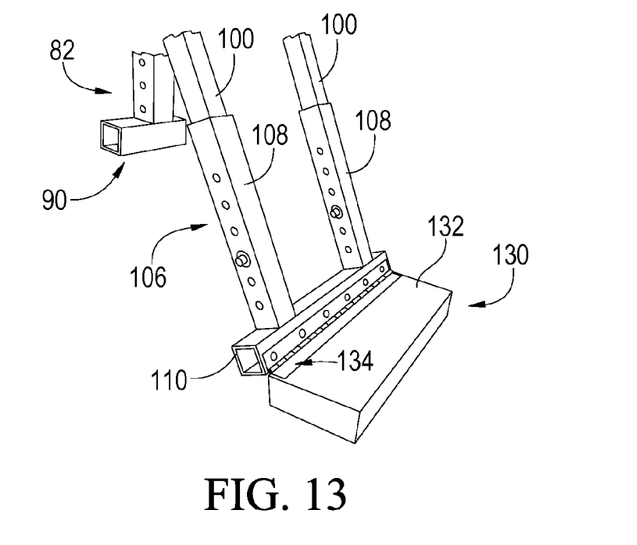
FIG. 13 is a perspective detail view of front legs of the slab dolly of FIG. 12.

As is shown in FIG. 13, the second front leg 82 of the slab dolly 120 includes an extendable element 130 that is attached to the transverse foot 110 of the extension element 106. The extendable element 130 includes a spacer 132 that is attached to the transverse foot 110 with a hinge 134. As is described below, the spacer 132 can be used to quickly increase (or decrease) the length of the second front leg 82 while the slab dolly 120 is being moved up stairs.

FIGS. 14A-14H illustrate an example of moving the slab dolly 120 described above in relation to FIGS. 12 and 13 up a flight of stairs. Again, although no slab is shown in those figures, it can be assumed that the slab dolly 120 supports a heavy slab of material that is secured with the slab securing mechanism 32 and securing straps. In the following description it is assumed that a single person is used to move the slab dolly 120.

Figure 14A:
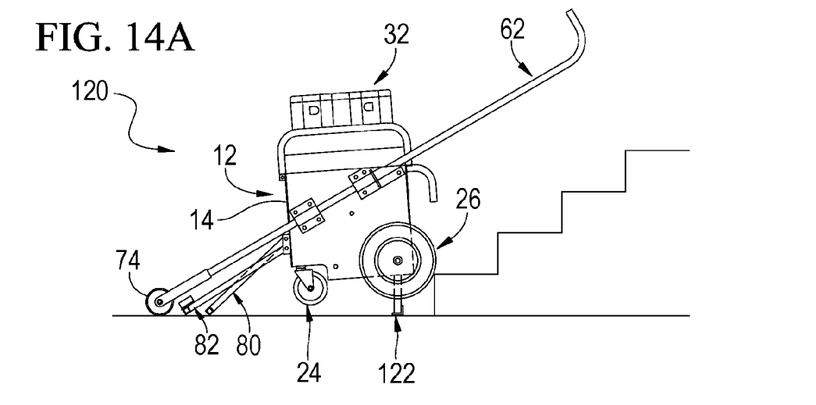
FIGS. 14A-14I are sequential side views illustrating maneuvering of the slab dolly of FIG. 12 up a flight of stairs.

Beginning with FIG. 14A, the slab dolly 120 is backed into the first step of stairs and the user lifts up the rear of the dolly with the maneuvering handles 62 from a position behind the dolly. When the user does this, the bottom leg 122 pivots downward relative to the body 12 so that is it substantially perpendicular to the base 122 of the body. The user can then set the dolly 120 down on the bottom leg 122, which will support part of the weight of the dolly and the slab, as indicated in FIG. 14A. As is apparent from that figure, the remaining portion of the weight is supported by the front end of the handles 62 and their wheels 74. Significantly, because of the bottom leg 122, the user only needs to lift the dolly 120 up a few inches before it supports its own weight.

Figure 14B:
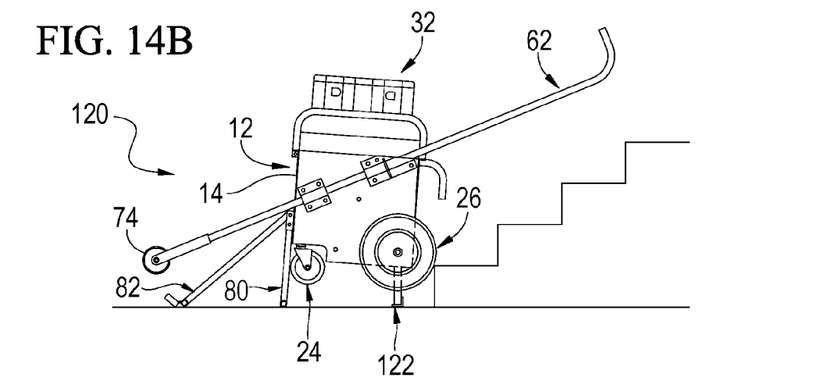

The user can then push downward on the handles 62 to pivot the front of the dolly 120 upward, as indicated in FIG. 14B. When the user does this, the first front leg 80 pivots downward so that it is flush with the front wall 14. The user can then allow the front of the dolly 120 to pivot downward so that the first front leg 80 engages the floor, as indicated in FIG. 14B. When in the position shown in FIG. 14B, the weight of the slab dolly 120 and its slab is entirely supported by the bottom leg 122 and the first front leg 80.

Figure 14C:
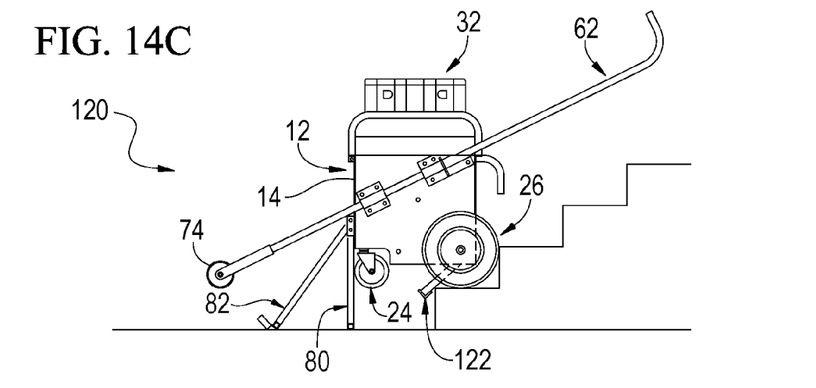

At this point, the rear wheels 26 of the slab dolly 120 are positioned adjacent to the top edge of the first step. To move the wheels 26 to the top of that step, the user first lifts up on the handles 62 to pivot the slab dolly 120 about the first front leg 80 and then pull backs on the handles to pull the wheels onto the first step. As the user pulls the slab dolly 120 back, the first front leg 80 (and the second front leg 82) will drag along the floor. Once the rear wheels 26 are on the first step, the user can push down on the handles 62 again so that the first front leg 80 again pivots downward. The user can then allow the front of the dolly 120 to pivot downward so that the first front leg 80 will engage the floor, as indicated in FIG. 14C. In that position, the weight of the dolly 120 and its slab is supported by the rear wheels 26 and the first front leg 80. As before, the user only needs to lift the dolly 120 up a few inches before it supports its own weight.

Figure 14D:
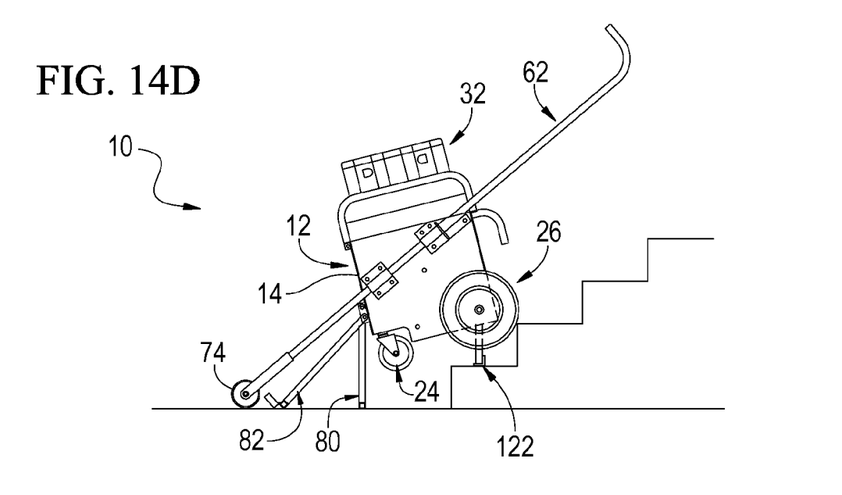

Once the slab dolly 120 is supported by the rear wheels 26 and the first front leg 80, the user can next lift the rear of the dolly with the handles 62 to enable the bottom leg 122 to again pivot downward. The user can then set the dolly 120 down on the bottom leg 122, as indicated in FIG. 14D. At this point, the weight of the dolly 120 and the slab is again supported by the first front leg 80 and the bottom leg 122.

Figure 14E:
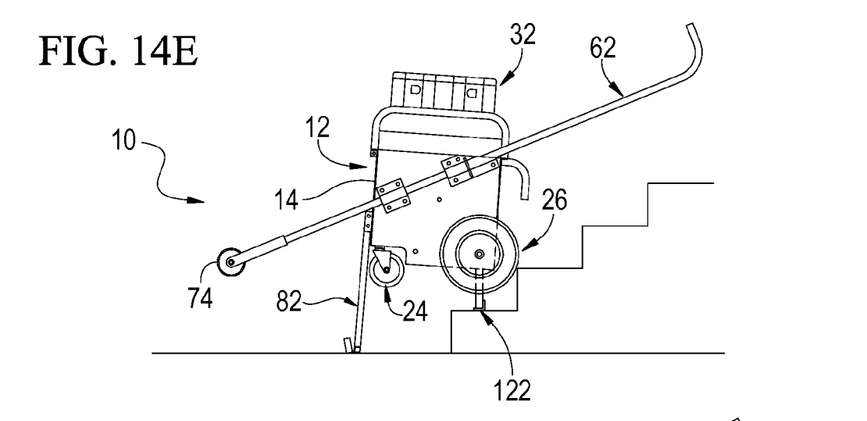

Next, the user can again push down on the handles 62 so as to pivot the front end of the slab dolly upward. When the user does this, the second front leg 82 will pivot downward relative to the body 12 and will ultimately reach a point at which it is flush with the front wall 14. If the user allows the front of the slab dolly 120 to then pivot downward, the second front leg 82 will engage the floor, as indicated in FIG. 14E. In the position shown in FIG. 14E, the weight of the slab dolly 120 and its slab is supported by the second front leg 82 and the bottom leg 122.

Figure 14F:
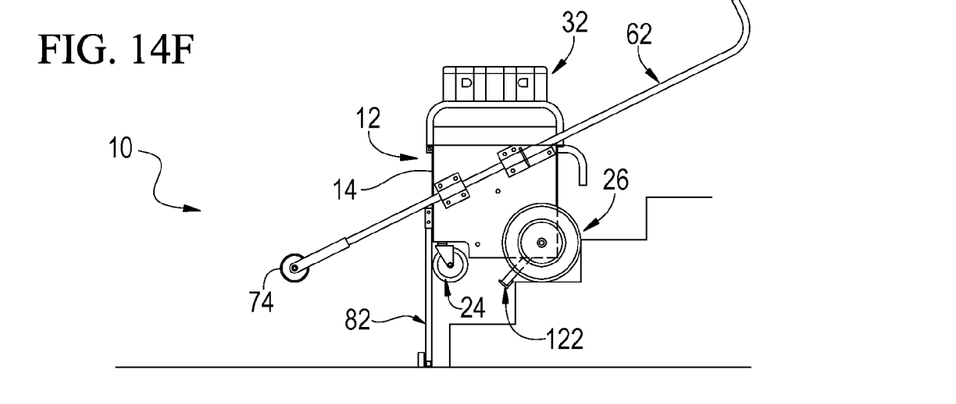

At this point, the user can pull up and backward on the handles 62 again to transition the rear wheels 26 to the second step. As the user does this, the slab dolly initially pivots about the second front leg 82. Once the wheels 26 are on the second step, the user can push down on the handles 62 again to enable the second front leg 82 to pivot downward, and then allow the front of the slab dolly 120 to pivot downward so that the second front leg 82 engages the floor at a point near the front side of the first step, as indicated in FIG. 14F. In the position shown in that figure, the weight of the slab dolly 120 and its slab is supported by the second front leg 82 and the rear wheels 26.

Figure 14G:
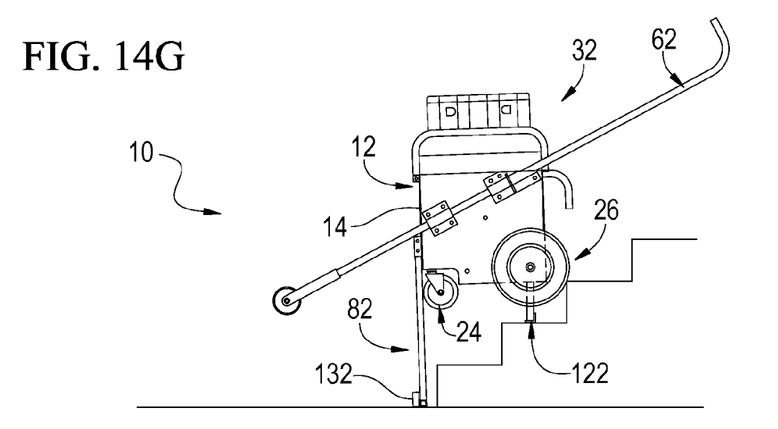
Figure 14H:
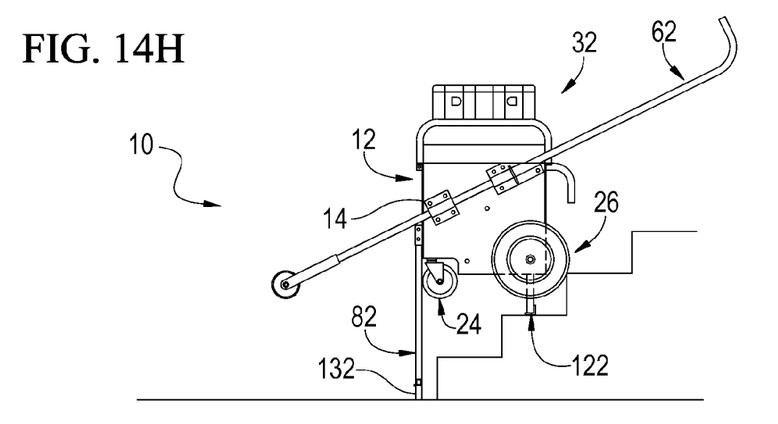

The user can then lift up on the handles 62 to pivot the slab dolly 120 about the second front leg 82 to enable the bottom leg 122 to engage the second step, as shown in FIG. 14G. In that configuration, the dolly 120 is supported by the bottom leg and the second front leg 82. Next, the user can push down on the handles 62 again to lift the front end of the dolly 120 and enable the spacer 132 to swing downward from the distal end of the second front leg 82 under the force of gravity. If the user again allows the front of the slab dolly 120 to pivot downward, the spacer 132 will engage the floor, as indicated in FIG. 14H.

Figure 14I:
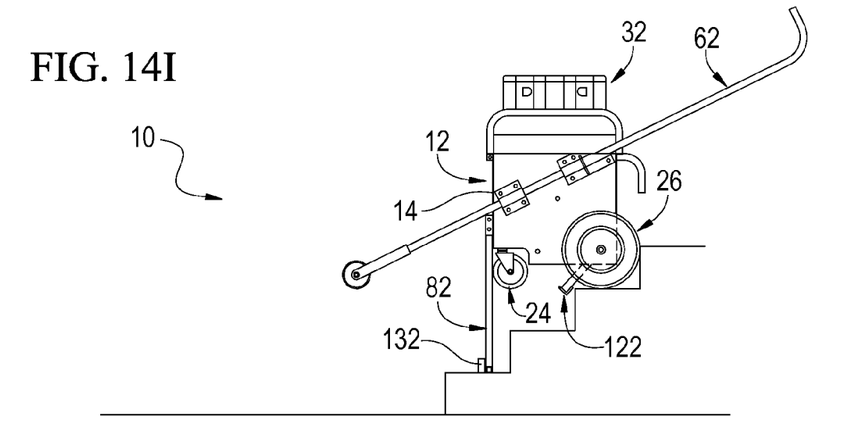

At this point, the user can lift up and backward on the handles 62 again to pull the wheels 26 up to the third step. As before, the user can then push down on the handles 62 to enable the second front leg 82 to pivot downward, and the user can allow the front of the slab dolly 120 to pivot downward so that the second front leg engages the first step at a point near the front side of the second step, as indicated in FIG. 14I.

Movement of the slab dolly 120 continues in the manner described above until each of the steps of the stairs has been traversed. As can be appreciated from the above discussion, the slab dolly 120 requires even less effort to move up the stairs than does the dolly 10 because smaller movements are used to walk the dolly 120 up the stairs. As a consequence, only a single user is needed.

The invention claimed is:

1. A slab dolly for moving slabs of material, the dolly comprising:
   a body adapted to support a slab of material and including a front wall;
   wheels that support the body;
   handles that extend to a rear of the body; and
   a front leg that is pivotally attached to the front wall of the body, the leg being adapted to pivot downward from a position in which it extends forward from the front wall to a position in which it is substantially parallel with the front wall so as to be able to engage a floor surface or a stair step to act as a pivot member about which the dolly can be pivoted to assist a user in moving the dolly up a flight of stairs.

2. The slab dolly of claim 1, wherein the body includes a slab securing mechanism that is adapted to support the slab of material in a vertical orientation.

3. The slab dolly of claim 2, wherein the slab securing mechanism includes a first lateral support and a second lateral support.

4. The slab dolly of claim 3, wherein the second lateral support is a pivoting component that is adapted to urge the slab against the first lateral support when the slab is supported by the mechanism.

5. The slab dolly of claim 4, wherein the second lateral support comprises a support member that includes a horizontal base and a vertical wall that form part of a rectangular gap into which the slab can be inserted.

6. The slab dolly of claim 5, wherein the support member is supported by pivot arms that are pivotally connected to both the support member and the body.

7. The slab dolly of claim 6, wherein the slab securing mechanism further includes a spring that maintains the support member in an upper orientation against the force of gravity.

8. The slab dolly of claim 2, wherein the first lateral support is pivotally connected to the body so that it can be folded down into a horizontal orientation in which it acts as a horizontal support platform.

9. The slab dolly of claim 1, wherein the wheels include front wheels and rear wheels.

10. The slab dolly of claim 1, wherein the handles comprise elongated shafts that extend to a front of the body and wheels that are attached to front ends of the elongated shafts, wherein the handles act as pivot members about which the dolly can be pivoted to assist a user in moving the dolly up the stairs.

11. The slab dolly of claim 10, wherein the elongated shafts are angled relative to the body such that they extend from a relatively high position to the rear of the body down to a relatively low position to the front of the body.

12. The slab dolly of claim 11, wherein the wheels attached to the elongated shafts contact or nearly contact the floor surface when the dolly rests on the floor surface.

13. The slab dolly of claim 1, wherein the front leg includes a first front leg and a second front leg that is longer than the first front leg, each front leg being pivotally attached to the front wall of the body and being pivotable downward from a position in which the leg extends forward from the front wall to a position in which it is substantially parallel with the front wall.

14. The slab dolly of claim 13, wherein the first front leg is adapted to engage the floor surface and the second front leg is adapted to engage the a stair steps.

15. The slab dolly of claim 13, wherein the front legs are adjustable in length.

16. The slab dolly of claim 1, wherein the dolly further includes a bottom leg that is pivotally attached to a base of the body, wherein the bottom leg can pivot downward to a position in which it is substantially perpendicular to the base.

17. The slab dolly of claim 13, wherein the second front leg comprises a spacer that is connected to its distal end with a hinge.

18. A method for moving a slab of material up stairs, the method comprising:
    supporting the slab on a body of a slab dolly;
    rolling the dolly backward along a floor surface until rear wheels of the dolly engage a first step of the stairs;
    lifting the rear of the body with handles of the dolly to pivot the body about wheels positioned in front of the body;
    pulling the dolly backward with the handles until the rear wheels rest on the first step;
    pushing down on the handles to lift the front of the dolly to cause a first front leg of the dolly to pivot downward; and
    pivoting the front of the dolly downward until the first front leg engages the floor surface and supports part of the weight of the dolly.

19. The method of claim 18, further comprising:
    lifting the rear of the body with the handles to pivot the body about the first front leg;
    pulling the dolly backward with the handles until the rear wheels rest on a second step of the stairs;
    pushing down on the handles to lift the front of the dolly and cause a second front leg of the dolly to pivot downward; and
    pivoting the front of the dolly downward until the second front leg engages the floor surface supports part of the weight of the dolly.

20. A method for moving a slab of material up stairs, the method comprising:
    supporting the slab on a body of a slab dolly;
    rolling the dolly backward along a floor surface until rear wheels of the dolly engage a first step of the stairs;
    lifting the rear of the body with handles of the dolly to pivot the body about wheels positioned in front of the body to cause a bottom leg of the dolly to pivot downward;
    pivoting the rear of the dolly downward until the bottom leg engages the floor surface and supports part of the weight of the dolly;
    pushing down on the handles to lift the front of the dolly and cause a first front leg of the dolly to pivot downward; and
    pivoting the front of the dolly downward until the first front leg engages the floor surface and supports part of the weight of the dolly.

21. The method of claim 20, further comprising:
    lifting the rear of the body with the handles to pivot the body about the first front leg and pulling the dolly backward until the rear wheels rest on the first step of the stairs;
    lifting the rear of the body with handles to pivot the body about the first front leg and enable the bottom leg to pivot downward;
    pivoting the rear of the dolly downward until the bottom leg engages the first step and supports part of the weight of the dolly;
    pushing down on the handles to lift the front of the dolly to cause a second front leg of the dolly to pivot downward; and
    pivoting the front of the dolly downward until the second front leg engages the floor surface and supports part of the weight of the dolly.

* * * * *